Figure 1:
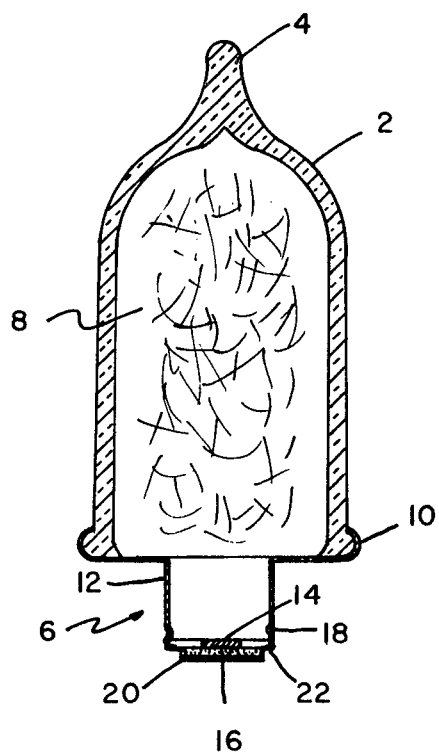

United States Patent

[11] 3,625,641

| [72] | Inventor | John W. Shaffer |
| | | Williamsport, Pa. |
| [21] | Appl. No. | 827,367 |
| [22] | Filed | May 23, 1969 |
| [45] | Patented | Dec. 7, 1971 |
| [73] | Assignee | Sylvania Electric Products Inc. |
| | | Continuation-in-part of application Ser. No. 670,299, Sept. 25, 1967. This application May 23, 1969, Ser. No. 827,367 |

[54] PHOTOFLASH LAMP
2 Claims, 2 Drawing Figs.

[52] U.S. Cl............................................. 431/93, 149/30
[51] Int. Cl....................................... F21k 5/02

[50] Field of Search............................................ 431/92–95

[56]  References Cited
UNITED STATES PATENTS

| 2,285,125 | 6/1942 | Pipkin............................ | 431/95 |
| 2,662,818 | 12/1953 | Schuricht...................... | 102/86.5 X |

FOREIGN PATENTS

| 431,953 | 7/1935 | Great Britain................ | 431/93 |

Primary Examiner—Edward J. Michael
Attorneys—Norman J. O'Malley and Joseph C. Ryan ABSTRACT: A percussive-type photoflash lamp, the primer of which includes a charge of water-based percussive material.

JOHN W. SHAFFER
INVENTOR

PHOTOFLASH LAMP

This application is a continuation-in-part of my copending application, Ser. No. 670,299, filed Sept. 25, 1967.

This invention relates to the manufacture of percussive-type photoflash lamps and more particularly to the composition of the charge of percussive material employed therewith.

Explosives used as the charge of percussive material in primers for munitions, such as mercury fulminate for example, are not adaptable to percussive flashlamp technology because the shock wave from such a detonation would break the glass envelope of the flashlamp. A highly sensitive percussive material that burns very rapidly but which does not detonate is required. Such a material may be formulated from potassium chlorate or lead dioxide in conjunction with either red phosphorous or phosphorous sesquisulfide in combination with powdered zirconium and using guncottom (cellulose nitrate as the binding agent. However, the combination of these components is potentially very hazardous to prepare and use even while the mixture is wet with an appropriate guncottom solvent such as amyl acetate.

The firing pin in a camera designed for use with percussive-type flashlamps is usually coupled to and released by the comparatively delicate shutter mechanism. This is in contrast to the firing pin in a ruggedly constructed firearm which is driven by a powerful spring. Any movement or vibration in the camera which would result from the action of a firing mechanism with a powerful spring would result in a blurred, unacceptable picture. Thus the charge of percussive material for the primer of percussive-type flashlamps must be extremely sensitive.

Previous methods of preparing the charge of percussive material for the primer of these flashlamps include the use of unmixed dry ingredients charged into the primer cup or shell followed by a drop of cellulose nitrate solution, and the use of premixed compositions based upon organic solvents and using cellulose nitrate as the binding agent. The dry powder technique is quite difficult to apply to automated production. Systems based upon organic solvents and cellulose nitrate function well but are considered to be prohibitively hazardous to prepare and handle in production.

In view of the foregoing, the principal object of this invention is to provide a charge of percussive material which is sufficiently sensitive to afford reliable ignition of percussive-type flashlamps while at the same time being sufficiently safe to be produced and handled in a large scale manufacturing operation.

I have found that a charge can be formulated using an entirely aqueous system which compares favorably in sensitivity to systems using cellulose nitrate as the binding agent. A water-soluble composition which is nonexplosive in nature is used. Although other water-soluble resins may be used, I prefer to use hydroxyethyl cellulose because of its tolerance for large quantities of dissolved salts. Such water-based compositions are safe to handle so long as water is present and the material is fluid.

By way of specific example, a charge of percussive material may comprise the following composition (by weight on a dried bases): 39.5 percent powdered zirconium, 16.7 percent potassium chlorate, 10.0 percent red phosphorous, 0.5 percent hydroxyethyl cellulose and 33.3 percent aluminum oxide abrasive. Sufficient water is added to give a viscous paste of the desired handling characteristics. Although the sensitivity of the formulation varies with changes in composition, the weight ratios may be varied somewhat without departing from the spirit of the invention. The abrasive may be eliminated entirely or may represent as high as 50 percent of the dried composition since it plays only a passive role. The zirconium powder acts to ignite the shredded combustible within the lamp but has no primary influence on the impact sensitivity of the charge. Thus the weight of zirconium may be varied from one to five times the combined weight of the potassium chlorate and phosphorous present; however, I prefer to use a ratio of about 1.5. The binder may represent from 0.2 to 5.0 percent by weight of the dried composition. Sensitivity and reliability of performance is more directly influenced by the weight ratio of potassium chlorate to phosphorous. This ratio should be from about 0.5 to 2.5.

In the accompanying drawings. FIG. 1 is an elevational view in section of one form of a percussive-type photoflash lamp with which a charge of the percussive material of this invention may be employed and FIG. 2 is an elevational view partly in section of another form of a percussive-type photoflash lamp with which said charge may be employed.

The flashlamp of FIG. 1 comprises a lamp envelope 2 having an exhaust tip 4 defining one end thereof and having a primer 6 sealed to the other end thereof. A combustible such as filamentary zirconium 8 and a combustion-supporting gas such as oxygen are disposed within the lamp envelope 2. The primer 6 comprises a metal shell or base 10 having a central depending cup portion 12 within which anvil 14 and a charge 16 of fulminating material of the type described above are disposed. The cup 12 is crimped at 18 to secure the anvil 14 in place therein. The bottom of the cup 12 is coined to define an accurately dimensioned reservoir 20 within which the charge of fulminating material is disposed and to provide an internal rim 22 on which the flat anvil is seated. Firing of the flashlamp is effected by causing a firing pin to strike the bottom of the reservoir and deform the same sufficiently to compress the charge of fulminating material therein. Compression of the charge causes it to deflagrate, throwing burning particles up into the lamp envelope 2 and igniting the filamentary combustible 8, which combustion is the source of the light output of the flashlamp.

Figure 2:
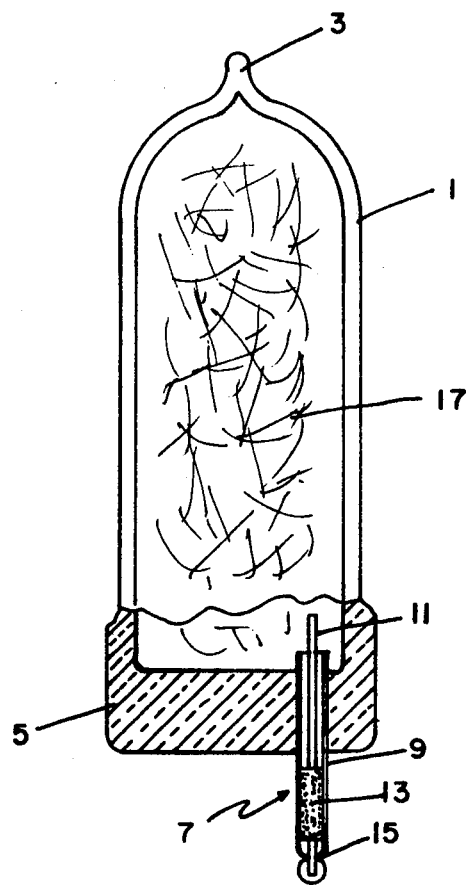

The flashlamp of FIG. 2 comprises a length of glass tubing defining a hermetically sealed lamp envelope 1 constricted at one end to define an exhaust tip 3 and shaped to define a seal 5 at the other end thereof. A primer 7 is sealed intermediate its ends in the seal 5. The primer 7 comprises a metal 9, a wire 11 and a charge of fulminating material 13. The end of the tube 9 located outside the lamp envelope 1 is closed whereas the other end, which is located inside the lamp envelope, is open. The wire 11 is supported within the tube 9 by a crimp 15 near the outside end thereof. The charge of fulminating material 13 is located on that segment of the wire 11 which is located in the exposed segment of the tube 9. A combustible such as filamentary zirconium 17 and a combustion-supporting gas such as oxygen are disposed within the lamp envelope 1. Operation of the lamp is initiated by an impact onto the tube 9 to cause deflagration of the fulminating material 13 up through the tube to ignite the combustible 17 disposed within the lamp envelope.

What I claim is:

1. A photoflash lamp comprising:
   an hermetically sealed, light-transmitting envelope;
   a quantity of filamentary combustible material located within said envelope;
   a combustion-supporting gas in said envelope;
   and a primer secured to one end of said envelope and in communication therewith, said primer including a charge of water-based fulminating material comprising about 39.5 percent powdered zirconium, about 16.7 percent potassium chlorate, about 10.0 percent red phosphorous, about 0.5 percent hydroxyethyl cellulose and about 33.3 percent aluminum oxide abrasive, all of said percentages being by weight on a dried basis.

2. The combination of claim 1 in which the charge of fulminating material comprises powdered zirconium, potassium chlorate, red phosphorous and a nonexplosive, water-soluble binder, the weight on a dry basis of said zirconium being from one to five times the combined weight of said potassium chlorate and said red phosphorous, the ratio of said potassium chlorate to said red phosphorous being from about 0.5 to 2.5, and said binder being from about 0.2 percent to about 5.0 percent by weight of the dry composition.

* * * * *